United States Patent
Mori

(10) Patent No.: US 9,767,054 B2
(45) Date of Patent: Sep. 19, 2017

(54) DATA TRANSFER CONTROL DEVICE AND MEMORY-CONTAINING DEVICE

(71) Applicant: MegaChips Corporation, Osaka-shi (JP)

(72) Inventor: Takashi Mori, Minoh (JP)

(73) Assignee: MegaChips Corporation, Osaka-shi (JP)

( * ) Notice: Subject to any disclaimer, the term of this patent is extended or adjusted under 35 U.S.C. 154(b) by 370 days.

(21) Appl. No.: 14/659,842

(22) Filed: Mar. 17, 2015

(65) Prior Publication Data

US 2015/0278113 A1 Oct. 1, 2015

(30) Foreign Application Priority Data

Mar. 31, 2014 (JP) ................................. 2014-072626

(51) Int. Cl.
*G06F 13/36* (2006.01)
*G06F 13/28* (2006.01)

(52) U.S. Cl.
CPC .................................... *G06F 13/28* (2013.01)

(58) Field of Classification Search
CPC ................................. G06F 13/28; G06F 13/36
USPC ..................................................... 710/308, 22
See application file for complete search history.

(56) References Cited

U.S. PATENT DOCUMENTS

| | | | | |
|---|---|---|---|---|
| 4,837,677 A * | 6/1989 | Burrus, Jr. | ............... | G06F 13/34 710/308 |
| 5,948,080 A * | 9/1999 | Baker | ................... | G06F 9/4411 370/431 |
| 6,047,336 A * | 4/2000 | Green, III | ............... | G06F 13/28 710/22 |
| 6,272,582 B1 * | 8/2001 | Streitenberger | .... | G06F 13/4027 710/314 |
| 6,453,366 B1 * | 9/2002 | Broberg, III | ............ | G06F 13/28 710/26 |
| 6,581,112 B1 * | 6/2003 | Kallat | ................. | G06F 13/4022 710/22 |
| 6,691,182 B2 * | 2/2004 | Kagemoto | .............. | G06F 13/28 710/22 |

(Continued)

FOREIGN PATENT DOCUMENTS

JP 4677581 4/2011

*Primary Examiner* — Paul R Myers
(74) *Attorney, Agent, or Firm* — Oblon, McClelland, Maier & Neustadt, L.L.P.

(57) ABSTRACT

An image processing module input/output port in a DMAC includes an input part which receives second address information and an addressing request signal from an image processing module and an output part which outputs a reply signal indicating valid reception of the second address information to the image processing module. The image processing module input/output port can perform signal input/output control processing of returning, in response to the addressing request signal, the reply signal indicating confirmation of valid reception of the second address information to the image processing module when valid reception of the second address information is confirmed. A memory access controller performs memory access processing of accessing a storage area to be accessed in a memory based on the first address information (=the second address information) received via the image processing module input/output port.

5 Claims, 8 Drawing Sheets

(56) References Cited

U.S. PATENT DOCUMENTS

| | | | | |
|---|---|---|---|---|
| 6,697,882 | B1* | 2/2004 | Matsui | G06F 12/0215 |
| | | | | 710/22 |
| 7,263,572 | B2* | 8/2007 | Hiji | G06F 13/4059 |
| | | | | 710/308 |
| 7,631,153 | B2* | 12/2009 | Mahrla | G06F 13/28 |
| | | | | 365/185.33 |
| 7,984,202 | B2* | 7/2011 | Hofmann | G06F 13/1621 |
| | | | | 710/110 |
| 8,291,124 | B2* | 10/2012 | Hirano | G06F 12/02 |
| | | | | 710/3 |
| 2002/0174272 | A1* | 11/2002 | Fujii | G06F 13/28 |
| | | | | 710/22 |
| 2004/0210817 | A1* | 10/2004 | Kapoor | G06F 21/577 |
| | | | | 714/763 |
| 2007/0299990 | A1* | 12/2007 | Ben-Yehuda | G06F 12/1081 |
| | | | | 710/22 |

* cited by examiner

F I G. 1
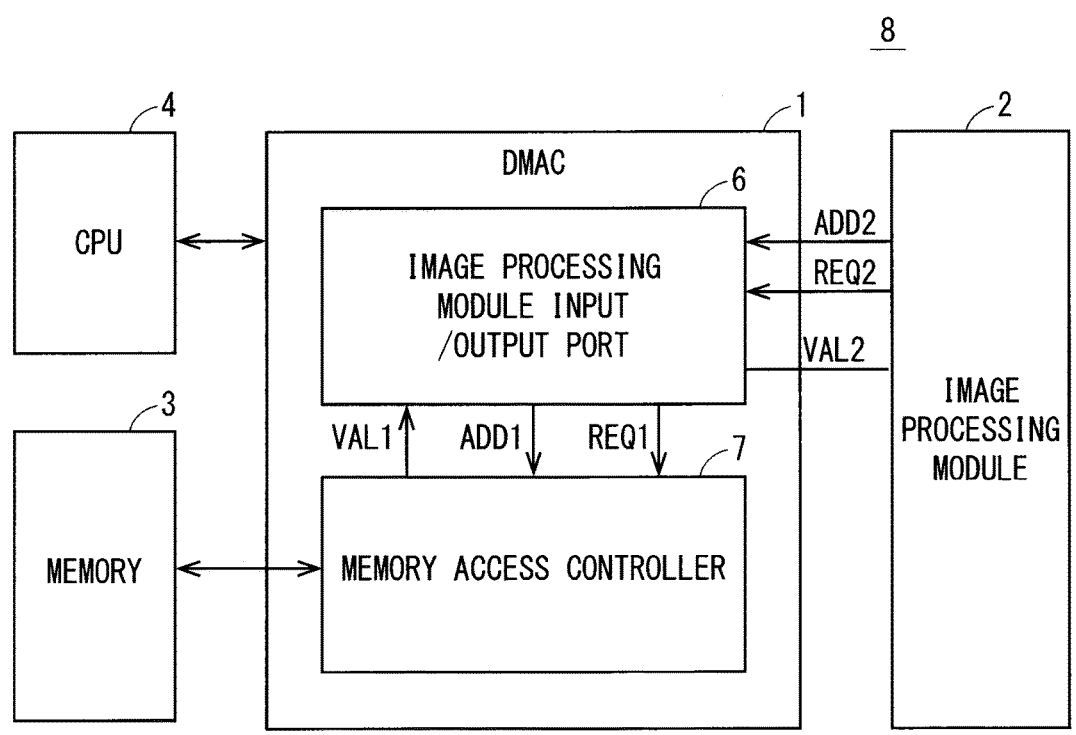

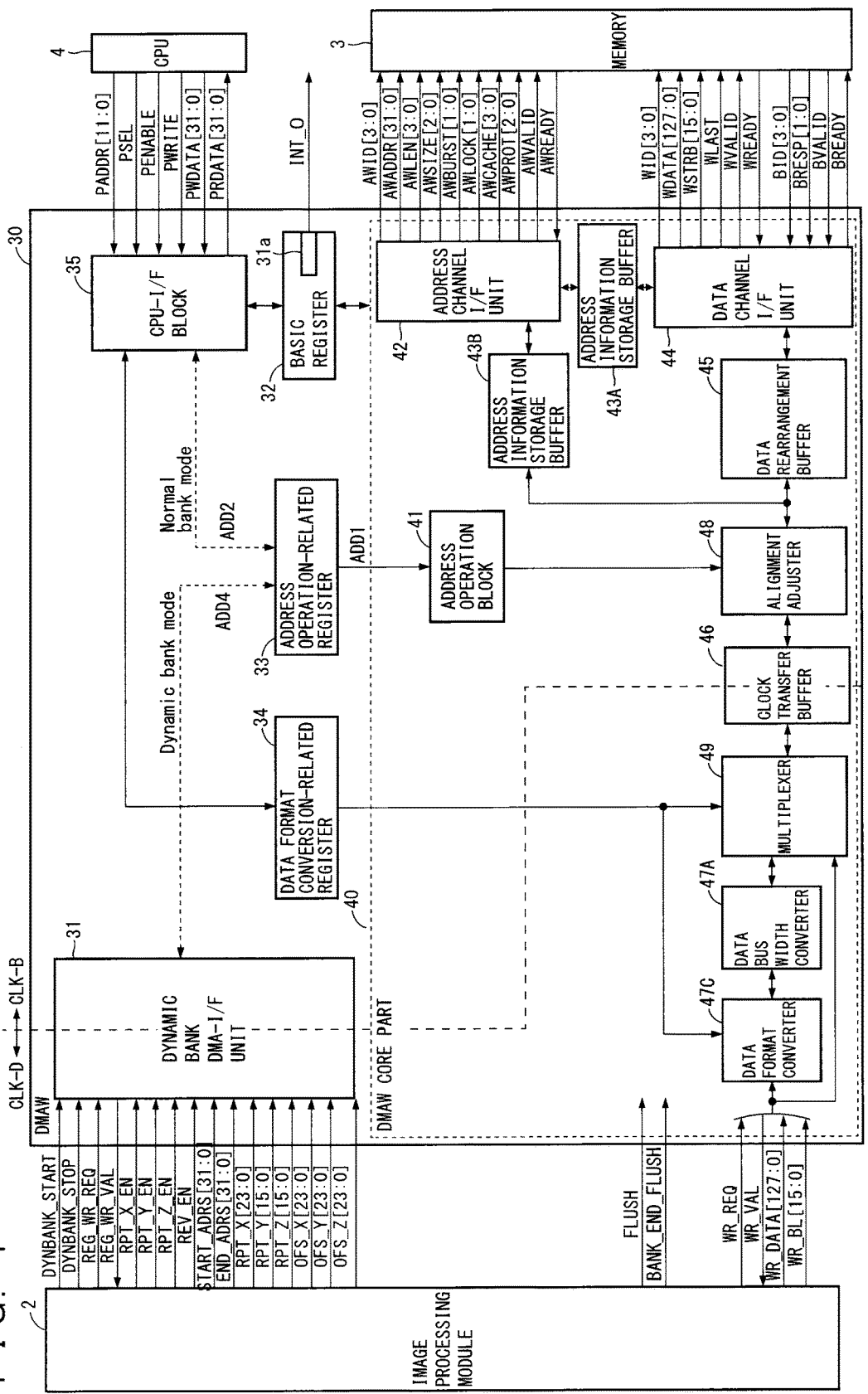
F I G. 4

F I G. 5
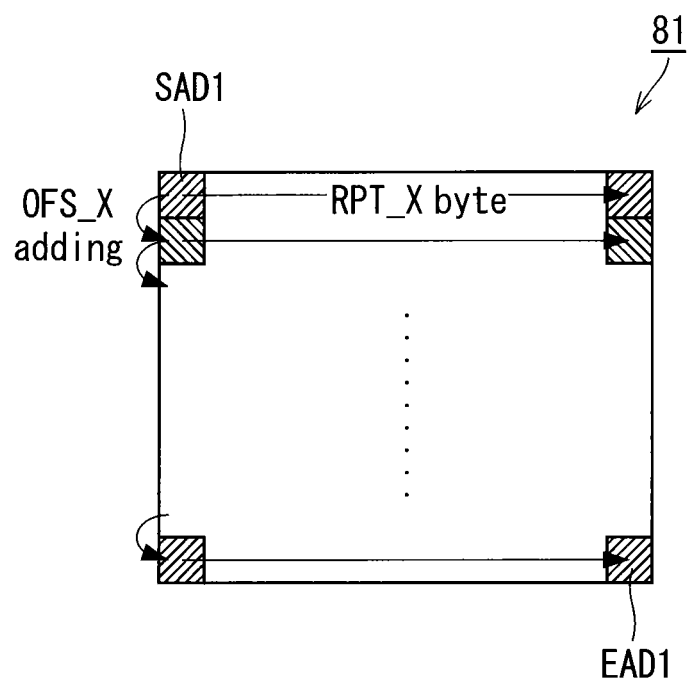

DATA TRANSFER CONTROL DEVICE AND MEMORY-CONTAINING DEVICE

BACKGROUND OF THE INVENTION

Field of the Invention

The present invention relates to a data transfer control device that conducts data transfer between a module, such as an image processing module, and a memory.

Description of the Background Art

A direct memory access (DMA) controller disclosed in Japanese Patent No. 4677581 is an example of a conventional data transfer control device that conducts data transfer between a module, such as an image processing module, and a memory.

The DMA controller disclosed in Japanese Patent No. 4677581 prepares, in four registers, two pairs of a start address and an end address of a main memory. Two selectors perform switching between a start address A of a storage area A of the main memory and a start address B of a storage area B of the main memory, and between an end address A of the storage area A and an end address B of the storage area B. An address counter increases a value of the start address of one of the pairs one by one to generate a destination address, and outputs the destination address to an arbiter. The arbiter controls a memory control circuit so that DMA transfer is conducted with respect to the destination address of the main memory. As a result, the DMA controller that reduces a load put on a CPU and improves a DMA transfer rate is provided.

FIG. 8 is a block diagram schematically showing configuration of conventional DMA transfer achieved, for example, by the DMA controller disclosed in Japanese Patent No. 4677581.

As shown in FIG. 8, data transfer between an image processing module 62 (a predetermined module) and a memory 63 is conducted via a DMA controller (DMAC) 61. In this case, a CPU 64 performs pre-setting processing of providing the DMAC 61 with address information indicating details of data transfer between the image processing module 62 and the memory 63 prior to the data transfer between the image processing module 62 and the memory 63 via the DMAC 61 (hereinafter, also simply referred to as "DMA data transfer"). The DMAC 61 controls the DMA data transfer based on the address information.

The address information indicates a storage area to be accessed typically by a start address and an end address (or information on the amount of data to be accessed) of the storage area to be accessed. The storage area, in the memory 63, from the start address to the end address to be accessed is herein referred to as a bank.

FIG. 9 schematically shows a plurality of banks BK0-BK2 in the memory 63. As shown in FIG. 9, the banks BK0-BK2 as storage areas to be accessed in the memory 63 can be designated by setting start addresses BST0-BST2 and end addresses BED0-BED2 as the address information.

When DMA data transfer is conducted in the order of the banks BK0, BK1, and BK2, for example, the CPU 64 performs address pre-setting processing of outputting address information {(BST0, BED0), (BST1, BED1), (BST2, BED2)} to the DMAC 61 prior to the DMA data transfer.

In the above-mentioned case, the DMAC 61 is required to store therein three pieces of address information specifying respective banks (pairs of a start address BSTi (i=0-2) and an end address BEDi), and is thus required to have the same number of storage areas for storing the address information as the number of banks targeted for the DMA data transfer.

Furthermore, a case where the image processing module 62 performs read processing of reading data from the bank BK0, which is accessed first, performs arithmetic processing based on the read data, and determines a start address of the bank BK1, which is accessed next, from the results of the arithmetic processing is considered.

In this case, the CPU 64 is required to perform a first address pre-setting processing of setting address information regarding the bank BK0, and, after DMA data transfer (the read processing performed by the image processing module 62) is conducted with respect to the bank BK0, to perform a second address pre-setting processing of setting address information regarding the bank BK1 based on the results of the arithmetic processing performed by the image processing module 62.

As set forth above, conventional DMA transfer achieved as described above has a problem in that a relatively high load is put on the CPU due to the need for intervention of the CPU.

There is also a problem of an increase in circuit size as the DMA controller is required to include storages for storing therein a plurality of pieces of address information so that the DMA controller can store therein the largest possible number of pieces of address information in order for the CPU to perform address pre-setting processing without any difficulty.

SUMMARY OF THE INVENTION

An object of the present invention is to provide a data transfer control device with a reduced circuit size and a reduced load on a CPU.

A data transfer control device according to the present invention is a data transfer control device that controls data transfer between a memory and a predetermined module, the predetermined module outputting an address signal group and an addressing request signal, the address signal group including a start address of a storage area to be accessed in the memory, the addressing request signal indicating a request for output of the address signal group, the data transfer control device including: an input/output port for use in communicating with the predetermined module, the input/output port including an input part which receives the address signal group and the addressing request signal and an output part which outputs an address valid signal indicating valid reception of the address signal group, the input/output port being capable of performing signal input/output control processing of outputting, in response to the addressing request signal, the address valid signal to the predetermined module when the address signal group is validly received; and a memory access controller performing memory access processing of accessing the storage area to be accessed in the memory based on the address signal group input via the input/output port.

In the transfer control device according to the present invention, the input/output port that includes the input part and the output part is capable of performing the signal input/output control processing of outputting, in response to the addressing request signal, the address valid signal indicating valid reception of the address signal group to the predetermined module when the address signal group is validly received.

The memory access controller included in the data transfer control device can therefore perform the memory access processing based on address signal groups sequentially input via the input/output port. Since the data transfer control device is not required to include storages for storing therein a plurality of address signal groups, a circuit size can be reduced.

In addition, since the predetermined module outputs different address signal groups sequentially, access to the memory can be achieved while switching a storage area to be accessed. Consequently, in the present invention, data transfer between the memory and the predetermined module can always be conducted with respect to a desired storage area as the storage area to be accessed, without intervention of the controller such as a CPU. A load put on the controller, such as the CPU, can be reduced significantly.

As a result, processing of frequently interrupting the CPU through memory access control is reduced, and thus the CPU can concentrate on other HW (HardWare) resources, leading to improvement of performance of a whole system.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing configuration of a DMAC as a data transfer control device in a preferred embodiment of the present invention and configuration of peripheral devices;

FIG. 4 is a block diagram showing a detail of internal configuration of a DMAW in the preferred embodiment;

FIG. 5 schematically shows repeat X transfer processing;

DESCRIPTION OF THE PREFERRED EMBODIMENT

Preferred Embodiment (Overall Configuration)

Figure 2:
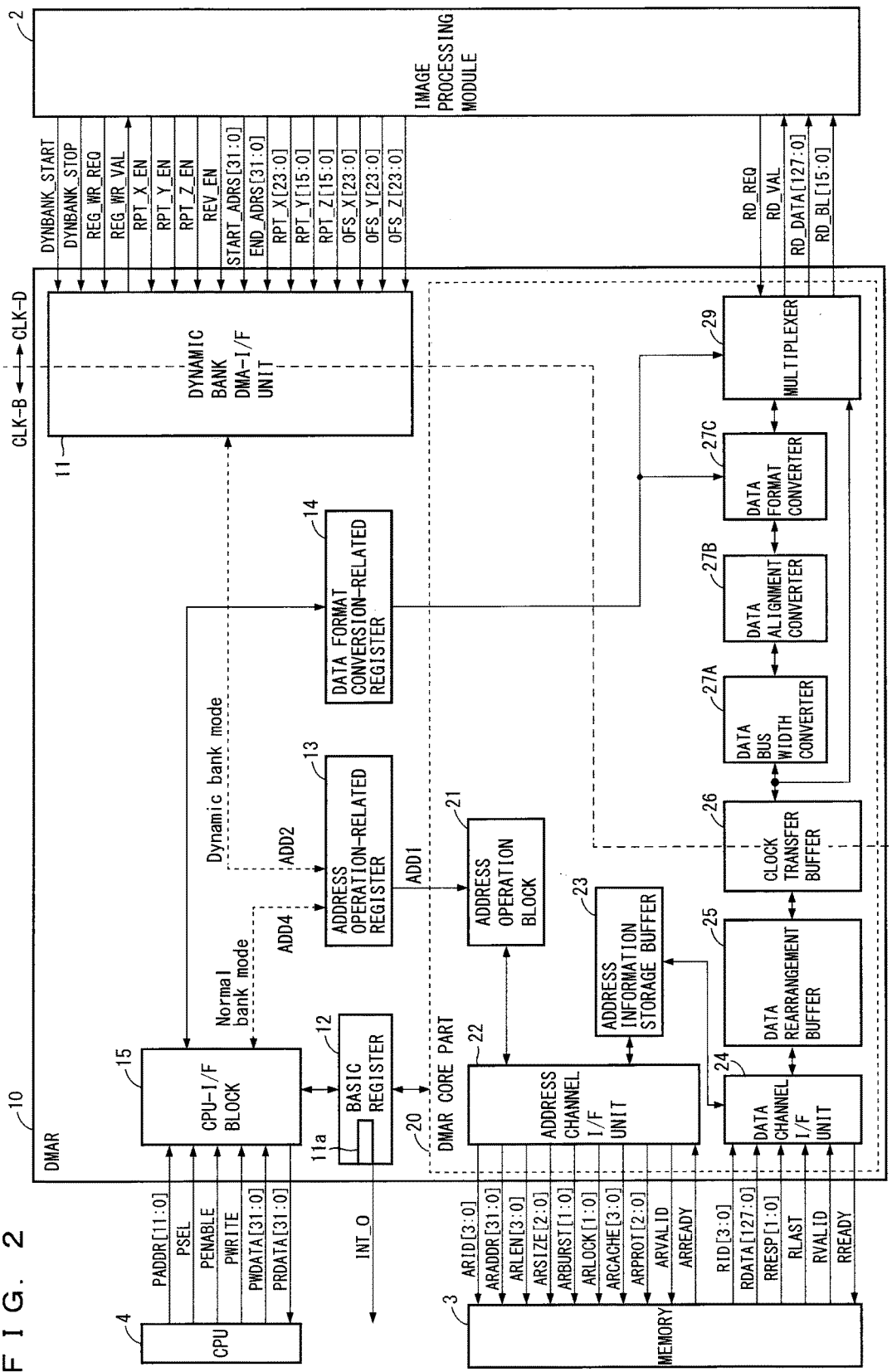
FIG. 2 is a block diagram showing a detail of internal configuration of a DMAR in the preferred embodiment.

FIG. 1 is a block diagram showing configuration of a DMA controller (DMAC) as a data transfer control device in a preferred embodiment of the present invention and configuration of peripheral devices.

As shown in FIG. 1, a memory-containing device 8 (a memory-containing device) includes a DMAC 1 in the preferred embodiment as well as an image processing module 2 (a predetermined module), a memory 3, and a CPU 4. The DMAC 1, the image processing module 2, the memory 3, and the CPU 4 are mounted on the same substrate. The DMAC 1 in the preferred embodiment controls data transfer between the memory 3 and the image processing module 2.

The image processing module 2 outputs address information ADD2 and an addressing request signal REQ2 to the DMAC 1. The address information ADD2 is an address signal group including a start address and an end address of a storage area to be accessed in the memory 3 in read processing and write processing. The addressing request signal REQ2 indicating a request for output of the address information ADD2.

The DMAC 1 includes an image processing module input/output port 6 that is an input/output port for used in communicating with the image processing module 2. The image processing module input/output port 6 includes an input part which receives the address information ADD2 and the addressing request signal REQ2, and an output part which outputs a reply signal VAL2 (an address valid signal) indicating valid reception of the address information ADD2.

FIG. 1 shows the image processing module 2 and the DMAC 1 corresponding to the image processing module 2. When the memory-containing device 8 further includes other modules, such as a display module, a module for external USB connection, and a module for a memory card, a DMAC is provided for each of the modules. That is to say, when the memory-containing device 8 includes a plurality of modules, a plurality of DMACs corresponding to respective modules are provided, and the memory 3 and the CPU 4 are shared among the plurality of DMACs. In this case, the plurality of DMACs each have equivalent functions to the DMAC 1, which is described in detail below.

The following describes operations performed in first configuration in which the image processing module input/output port 6 includes therein no storage, such as a register.

In this case, the address information ADD2 and the request signal REQ2 acquired from the image processing module 2 are respectively output as address information ADD1 (=ADD2) and a request signal REQ1 (=REQ2) to a memory access controller 7 via the image processing module input/output port 6. The memory access controller 7 outputs, in response to the request signal REQ1 (=REQ2), a reply signal VAL1 indicating valid reception of the address information ADD1 (=ADD2) as the reply signal VAL2 to the image processing module 2 via the image processing module input/output port 6 when the address information ADD1 (=ADD2) is validly received.

In the first configuration, the image processing module input/output port 6 is capable of performing signal input/output control processing of receiving, as input, the address information ADD2 and the request signal REQ2, and returning, in response to the addressing request signal REQ2, the reply signal VAL2 (=VAL1) indicating valid reception of the address information ADD1 (=ADD2) to the image processing module 2 when the reply signal VAL1 is received from the memory access controller 7 i.e., when valid reception of the address information ADD1 (=ADD2) is confirmed.

Next, the following describes operations performed in second configuration in which the image processing module input/output port 6 includes therein a storage, such as a register.

In this case, the address information ADD2 and the request signal REQ2 output from the image processing module 2 are input into the image processing module input/output port 6. The image processing module input/output port 6 outputs, in response to the request signal REQ2, the reply signal VAL2 indicating valid reception (valid storage) of the address information ADD2 to the image processing module 2 when the image processing module input/output port 6 includes a free storage therein, and the address information ADD2 is validly received (stored).

In the second configuration, the image processing module input/output port 6 is capable of performing signal input/output control processing of receiving, as input, the address information ADD2 and the request signal REQ2, and returning, in response to the addressing request signal REQ2, the reply signal VAL2 indicating valid reception of the address information ADD2 to the image processing module 2 when valid reception of the address information ADD2 is confirmed.

The memory access controller 7 performs memory access processing of receiving the address information ADD2 output from the image processing module 2 as the address information ADD1 (=ADD2) via the image processing module input/output port 6, and accessing a storage area to be accessed in the memory 3 based on the address information ADD1.

In the preferred embodiment, the DMAC 1 includes a DMAR 10 for read processing and a DMAW 30 for write processing as described in detail later. The DMAR 10 and the DMAW 30 each include the image processing module input/output port 6 and the memory access controller 7 shown in FIG. 1 independently of each other.

(DMAR 10)

FIG. 2 is a block diagram showing a detail of internal configuration of the DMAR 10. As shown in FIG. 2, the DMAR 10 included in the DMAC 1 in the preferred embodiment controls DMA data transfer, which is data transfer between the memory 3 and the image processing module 2 in reading data from the memory 3.

The image processing module 2 outputs, to a dynamic bank DMA-I/F unit 11, information {RPT_X_EN, RPT_Y_EN, RPT_Z_EN, REV_EN, START_ADR[31:0], END_ADR[31:0], RPT_X[23:0], RPT_Y[15:0], RPT_Z[15:0], OFS_X[23:0], OFS_Y[23:0], OFS_Z[23:0]} as the address information ADD2, which is an address signal group including a start address and an end address of a storage area to be accessed in the memory 3 in read processing. The dynamic bank DMA-I/F unit 11 corresponds to part of the image processing module input/output port 6 shown in FIG. 1.

The image processing module 2 further outputs a signal {REG_WR_REQ} as the addressing request signal REQ2 to the dynamic bank DMA-I/F unit 11. A signal DYNBANK_START is a signal indicating start of transfer in a dynamic bank mode, and a signal DYNBANK_STOP is a signal indicating forced termination of transfer in the dynamic bank mode. [X:0] means bit groups 0-X of (X+1) bits.

The dynamic bank DMA-I/F unit 11 includes an input part which receives the address information ADD2 and the addressing request signal REQ2, and an output part which outputs a reply signal VAL2 {REG_WR_VAL} indicating valid reception of the address information ADD2.

The dynamic bank DMA-I/F unit 11 is capable of performing signal input/output control processing of outputting, in response to the addressing request signal REQ2, the reply signal VAL2 indicating valid reception of the address information ADD2 to the image processing module 2 when the address information ADD2 is validly received.

In addition to the above-mentioned dynamic bank DMA-I/F unit 11, the DMAR 10 includes a basic register 12, an address operation-related register 13, a data format conversion-related register 14, a CPU-I/F block 15, and a DMAR core part 20.

The DMAR 10 in the preferred embodiment performs DMA data transfer processing in the dynamic bank mode when start of transfer in the dynamic bank mode is indicated by the signal DYNBANK_START. The following describes configuration of the DMAR 10, in particular, configuration of the DMAR 10 related to the above-mentioned feature.

The dynamic bank DMA-I/F unit 11 outputs the address information ADD2 received from the image processing module 2 to the address operation-related register 13. In this case, an operation clock is switched from a device clock CLK-D for the image processing module 2 to a bus clock CLK-B for the DMAR 10.

In the dynamic bank mode, the address operation-related register 13 temporarily stores the above-mentioned address information ADD2 received via the dynamic bank DMA-I/F unit 11, and transfers the address information ADD2 as the address information ADD1 to an address operation block 21 included in the DMAR core part 20. The address operation-related register 13 and the above-mentioned dynamic bank DMA-I/F unit 11 constitute the image processing module input/output port 6 shown in FIG. 1.

The address operation block 21 performs address operation based on the address information ADD1, and outputs various control signals {ARID[3:0], ARADDR[31:0], ARLEN[3:0], ARSIZE[2:0], ARBURST[1:0], ARLOCK[1:0], ARCACHE[3:0], ARPORT[2:0], ARVALID} for read control to the memory 3 via an address channel I/F unit 22. A signal ARREADY is a signal indicating that the memory 3 has received the various control signals from the address channel I/F unit 22.

The memory 3 outputs, in response to the above-mentioned control signals, a read data signal group {RID[3:0], RDATA[127:0], RRESP[1:0], RLAST, RVALID} to a data rearrangement buffer 25 via a data channel I/F unit 24. A signal RREADY is a signal indicating that the data channel I/F unit 24 has received the read data group from the memory 3.

An address information storage buffer 23 stores therein address information used by the address channel I/F unit 22 and the data channel I/F unit 24.

Data pieces read from the memory 3 are rearranged by the data rearrangement buffer 25 as necessary via the data channel I/F unit 24, and a clock transfer buffer 26 switches a clock (from the bus clock CLK-B to the device clock CLK-D). Then, a data bus width converter 27A converts a data bus, a data alignment converter 27B converts data alignment, a data format converter 27C converts data format, and a multiplexer 29 outputs read data {RD_DATA[127:0], RD_BL[15:0]} and the like. Signals RD_REQ and RD_VAL are respectively a read request signal output from the image processing module 2 and a reply signal output from the multiplexer 29 to the image processing module 2. The data format converter 27C and the multiplexer 29 operate based on data stored in the data format conversion-related register 14.

The memory access controller 7 included in the DMAR 10 shown in FIG. 1 is constituted mainly from the DMAR core part 20 as described above.

The CPU-I/F block 15 receives address information ADD4 {PADDR[11:0], PSEL, PENABLE, PWRITE, PWDATA[31:0]}, which are address information output from the CPU 4 used in a normal bank mode, and outputs the received address information ADD4 to the address operation-related register 13. A signal PRDATA[31:0] is data read from the DMAR 10 to the CPU 4.

In the normal bank mode, the address operation-related register 13 temporarily stores the address information ADD4, and transfers the address information ADD4 as the address information ADD1 to the address operation block 21 included in the DMAR core part 20.

The basic register 12 is a register for data transfer between the CPU-I/F block 15 and the DMAR core part 20. A signal INT_O is an interrupt signal.

Figure 3:
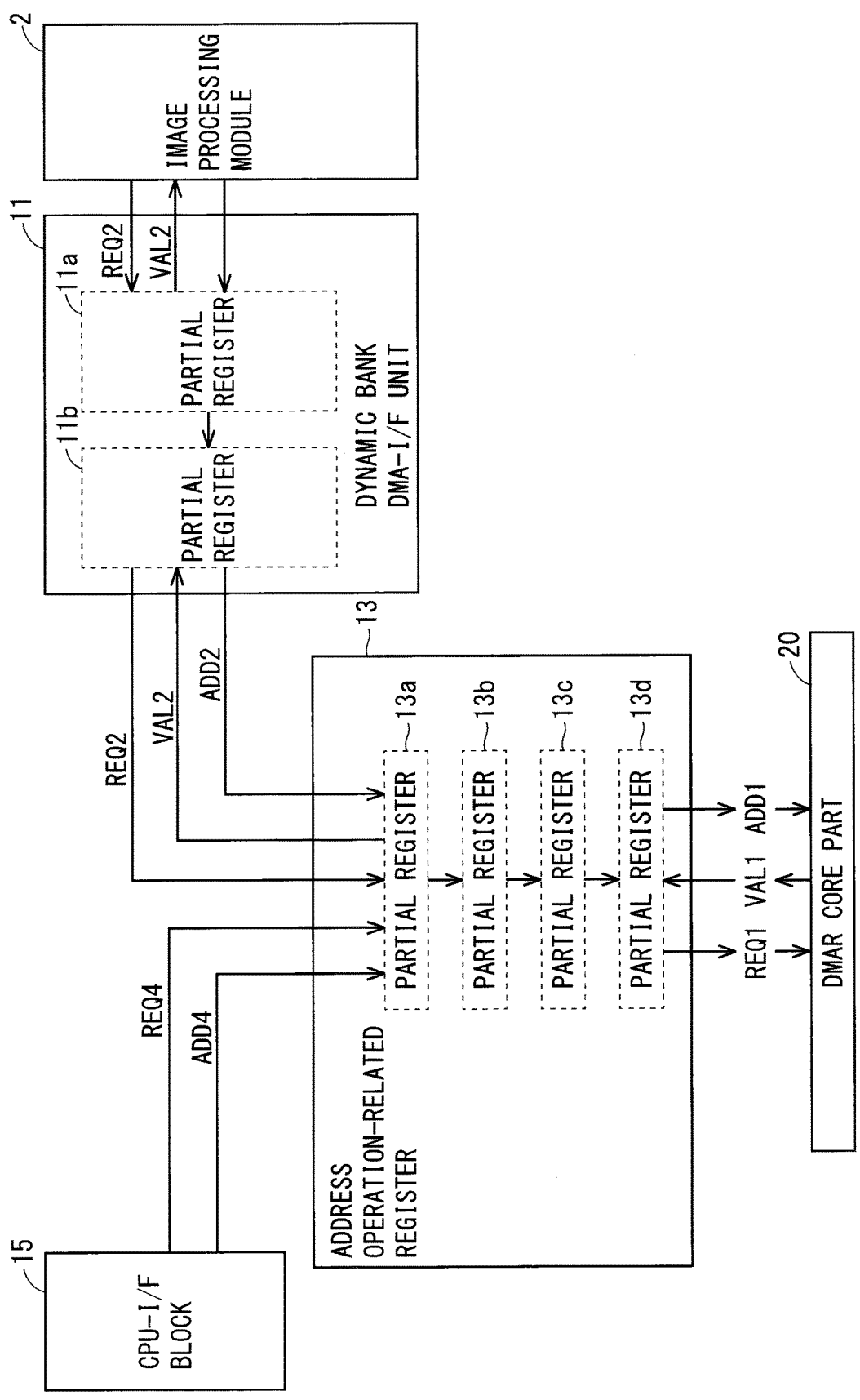
FIG. 3 is a block diagram schematically showing signal input control processing of inputting address information performed by a dynamic bank DMA-I/F unit in the preferred embodiment.

FIG. 3 is a block diagram schematically showing signal input control processing of inputting the address information ADD2 performed by the dynamic bank DMA-I/F unit 11 and the like in the preferred embodiment.

(In Dynamic Bank Mode)

The following describes the signal input control processing performed by the DMAR 10 in the dynamic bank mode. When the image processing module 2 accesses the memory 3, for example, through read processing or write processing, the image processing module 2 outputs, to the dynamic bank DMA-I/F unit 11, the address information ADD2 indicating a storage area to be accessed in the memory 3 and the addressing request signal REQ2 requesting output of the address information ADD2.

The following describes operations performed in the first configuration in which the dynamic bank DMA-I/F unit 11 and the address operation-related register 13, which constitute the image processing module input/output port 6, include therein no storage, such as a register.

The addressing request signal REQ2 is input into the address operation-related register 13 via the dynamic bank DMA-I/F unit 11, and the address operation-related register 13 outputs the request signal REQ2 to the DMAR core part 20 as the addressing request signal REQ1 (=REQ2). The DMAR core part 20 (the address operation block 21) outputs, in response to the addressing request signal REQ1, the reply signal VAL1 indicating valid reception of the address information ADD1 when valid reception of the address information ADD1 (=ADD2) is confirmed.

The reply signal VAL1 is transferred as the reply signal VAL2 to the image processing module 2 via the address operation-related register 13 and the dynamic bank DMA-I/F unit 11. As a result, the image processing module 2 can output, in response to the reply signal VAL2 (=VAL1), new address information ADD2 that is different from current address information ADD2.

In order to conduct data transfer between the image processing module 2 and the DMAR 10 smoothly, the dynamic bank DMA-I/F unit 11 and the address operation-related register 13 may include therein a plurality of FIFO signal storages. In FIG. 3, the dynamic bank DMA-I/F unit 11 includes two partial registers 11a and 11b that are connected in series, and the address operation-related register 13 includes four partial registers 13a-13d that are connected in series, as shown by dotted lines.

Next, the following describes operations performed in the second configuration in which the dynamic bank DMA-I/F unit 11 and the address operation-related register 13, which constitute the image processing module input/output port 6, include therein a storage, such as a register.

In the second configuration, after normal storage of the address information ADD2 in the partial register 11a at the initial stage is confirmed by the dynamic bank DMA-I/F unit 11 alone, the dynamic bank DMA-I/F unit 11 can return, in response to the addressing request signal REQ2, the reply signal VAL2 indicating normal storage (valid reception) of the address information ADD2. In this case, the address information ADD2 is stored in the partial register 11a.

Similarly, after normal storage of the address information ADD2 in the partial register 13a at the initial stage is confirmed, the address operation-related register 13 can return, in response to the addressing request signal REQ2 output from the dynamic bank DMA-I/F unit 11, the reply signal VAL2 indicating normal storage to the dynamic bank DMA-I/F unit 11. In this case, the address information ADD2 output from the partial register 11b at the last stage of the dynamic bank DMA-I/F unit 11 is stored as the address information ADD1 in the partial register 13a at the initial stage of the address operation-related register 13.

When the address operation-related register 13 stores the address information ADD1 in the partial register 13d at the last stage, the address operation-related register 13 outputs the request signal REQ1 indicating a request for output of the address information ADD1 to the DMAR core part 20.

As described above, by including therein FIFO signal storages, the dynamic bank DMA-I/F unit 11 and the address operation-related register 13 can receive the address information ADD2 output from the image processing module 2 more smoothly.

(In Normal Bank Mode)

The following describes the signal input/output control processing performed by the DMAR 10 in the normal bank mode. In order to perform the address pre-setting processing prior to DMA data transfer between the image processing module 2 and the memory 3, the CPU 4 outputs the address information ADD4 to the address operation-related register 13 via the CPU-I/F block 15 along with an addressing request signal REQ4. As a result, the address information ADD4 is stored in the address operation-related register 13 as the address information ADD1.

When the address operation-related register 13 includes therein four FIFO partial registers 13a-13d as shown in FIG. 3, the address information ADD1 (=ADD4) for four banks can be stored in the address pre-setting processing.

When the address operation-related register 13 stores the address information ADD1 in the partial register 13d at the last stage, the address operation-related register 13 outputs the addressing request signal REQ1 to the DMAR core part 20. The DMAR core part 20 (the address operation block 21) outputs, in response to the addressing request signal REQ1, the reply signal VAL1 indicating valid reception of the address information ADD1 when valid reception of the address information ADD1 is confirmed.

The address operation-related register 13 can output, in response to the reply signal VAL1, next address information ADD1 (address information ADD1 transferred from the partial register 13c to the partial register 13d) to the DMAR core part 20. In the normal bank mode, the reply signal VAL1 may be returned to the CPU 4 via the CPU-I/F block 15 as in the first configuration in the dynamic bank mode.

As described above, the DMAR 10 included in the DMAC 1 in the preferred embodiment includes the dynamic bank DMA-I/F unit 11 that serves as an input/output port including an input part for the address information ADD2 and the addressing request signal REQ2, and an output part for the reply signal VAL2. In the dynamic bank mode, the dynamic bank DMA-I/F unit 11 performs the signal input/output control processing of outputting, in response to the addressing request signal REQ2, the reply signal VAL2 indicating valid reception of the address information ADD2 to the image processing module 2 when the address information ADD2 is validly received.

The memory access controller 7 included in the DMAR 10 can therefore perform the memory access processing of accessing the memory 3 based on pieces of the address information ADD2 sequentially input via the dynamic bank DMA-I/F unit 11. Since the DMAR 10 is not required to include storages for storing therein a plurality of pieces of the address information ADD2 (ADD1), a circuit size can be reduced.

For example, in the first configuration in which the dynamic bank DMA-I/F unit 11 and the address operation-related register 13 include no storage therein, the dynamic bank DMA-I/F unit 11 and the address operation-related register 13 can perform the above-mentioned signal input/output control processing, and can thus sequentially receive pieces of the address information ADD2 output from the image processing module 2 as pieces of the address information ADD1 and output the pieces of the address information pieces ADD1 to the DMAR core part 20.

Conventional DMA transfer has the problem of the increase in circuit size as the DMA controller is required to include therein storages for setting a plurality of (N) addresses in order for the CPU to perform pre-setting processing to reduce dependence on the CPU by 1/N. The DMAR 10 in the preferred embodiment can solve the problem.

In addition, in the dynamic bank mode of the DMAR 10, the image processing module 2 can perform read processing of sequentially reading data pieces from the memory 3 by switching a storage area to be accessed by the image processing module 2 through change of the address information ADD2. Consequently, the DMAR 10 in the preferred embodiment can continuously perform data transfer between the memory 3 and the image processing module 2 in read processing with respect to a desired storage area in the memory 3 as the storage area to be accessed, without intervention of the CPU 4. A load put on the CPU 4 can be reduced significantly.

Conventional DMA transfer has a problem in that address setting to the DMA controller is achieved by interrupt processing to the CPU, and, due to the need for intervention of the CPU (software processing), hardware performance cannot sufficiently be achieved by dependence on the software processing. The DMAR 10 in the preferred embodiment can also solve the problem.

As a result, memory access control processing of frequently interrupting the CPU 4 is reduced, and thus the CPU 4 can concentrate on other HW resources, leading to improvement of performance of a whole system.

Furthermore, the dynamic bank DMA-I/F unit 11 includes the partial registers 11a and 11b (signal storages) that hold the address information ADD2 in FIFO. Similarly, the address operation-related register 13 includes the partial registers 13a-13d (signal storages). The dynamic bank DMA-I/F unit 11 and the address operation-related register 13 can take in at least one (two and four, respectively, in the example of FIG. 3) piece of the address information ADD2 from the image processing module 2 in advance, and thus a stand-by time during output of the address information ADD2 and the addressing request signal REQ2 from the image processing module 2 can effectively be reduced.

(DMAW 30)

FIG. 4 is a block diagram showing a detail of internal configuration of the DMAW 30. As shown in FIG. 4, the DMAW 30 included in the DMAC 1 in the preferred embodiment controls data transfer between the memory 3 and the image processing module 2 in writing data to the memory 3.

The DMAW 30 is different from the DMAR 10 in that the DMAW 30 controls data transfer in write processing in place of read processing. Basic operation of the DMAW 30, however, is similar to that of the DMAR 10, and thus description of the similar operation is omitted as appropriate.

The image processing module 2 outputs, to a dynamic bank DMA-I/F unit 31, information {RPT_X_EN, RPT_Y_EN, RPT_Z_EN, REV_EN, START_ADR[31:0], END_ADR[31:0], RPT_X[23:0], RPT_Y[15:0], RPT_Z[15:0], OFS_X[23:0], OFS_Y[23:0], OFS_Z[23:0]} as the address information ADD2, which is an address signal group including a start address and an end address of a storage area to be accessed in the memory 3 in write processing. The dynamic bank DMA-I/F unit 31 corresponds to part of the image processing module input/output port 6 shown in FIG. 1.

The image processing module 2 further outputs a signal {REG_WR_REQ} as the addressing request signal REQ2 to the dynamic bank DMA-I/F unit 31.

The dynamic bank DMA-I/F unit 31 includes an input part which receives the address information ADD2 and the addressing request signal REQ2, and an output part which outputs a reply signal VAL2 {REG_WR_VAL} indicating confirmation of reception of the address information ADD2.

The dynamic bank DMA-I/F unit 31 is capable of performing signal input/output control processing of outputting, in response to the addressing request signal REQ2, the reply signal VAL2 indicating valid reception of the address information ADD2 to the image processing module 2 when the address information ADD2 is validly received, as with the dynamic bank DMA-I/F unit 11 included in the DMAR 10.

In addition to the above-mentioned dynamic bank DMA-I/F unit 31, the DMAW 30 includes a basic register 32, an address operation-related register 33, a data format conversion-related register 34, a CPU-I/F block 35, and a DMAW core part 40.

Regarding the relationship between the DMAW 30 and the DMAR 10, the basic register 32, the address operation-related register 33, the data format conversion-related register 34, and the CPU-I/F block 35 respectively correspond to the basic register 12, the address operation-related register 13, the data format conversion-related register 14, and the CPU-I/F block 15, and perform similar operation to the corresponding components of the DMAR 10. The DMAW core part 40 corresponds to the DMAR core part 20 included in the DMAR 10.

The DMAW 30 in the preferred embodiment performs DMA data transfer processing in the dynamic bank mode, as with the DMAR 10. The following describes configuration of the DMAW 30, in particular, configuration of the DMAW 30 related to the above-mentioned feature.

The dynamic bank DMA-I/F unit 31 outputs the address information ADD2 received from the image processing module 2 to the address operation-related register 33. In this case, the operation clock is switched from the device clock CLK-D for the image processing module 2 to the bus clock CLK-B for the DMAW 30.

In the dynamic bank mode, the address operation-related register 33 temporarily stores the above-mentioned address information ADD2, and transfers the address information ADD2 as the address information ADD1 to an address operation block 41 included in the DMAW core part 40. The address operation-related register 33 and the above-mentioned dynamic bank DMA-I/F unit 31 constitute the image processing module input/output port 6 shown in FIG. 1.

The address operation block 41 performs address operation based on the address information ADD1, and outputs various control signals {AWID[3:0], AWADDR[31:0], AWLEN[3:0], AWSIZE[2:0], AWBURST[1:0], AWLOCK[1:0], AWCACHE[3:0], AWPORT[2:0], AWVALID} for write control to the memory 3 via an alignment adjuster 48, an address information storage buffer 43B, and an address channel I/F unit 42. A signal AWREADY is a signal indicating that the memory 3 has received the various control signals from the address channel I/F unit 42.

The image processing module 2 outputs write data {WR_DATA[127:0], WR_BL[15:0]} to the DMAW core part 40 along with a write request signal {WR_REQ} requesting write processing. A signal WR_VAL is a reply signal indicating confirmation of reception of the write data from the data format converter 47C included in the DMAW core part 40.

The data format converter 47C and a data bus width converter 47A respectively convert a data format and a data bus width of the write data, a multiplexer 49 performs selection processing, and a clock transfer buffer 46 switches the clock (from the bus clock CLK-B to the device clock CLK-D). The data format converter 47C and the multiplexer 49 operate based on data stored in the data format conversion-related register 34.

After the alignment adjuster 48 adjusts alignment, and then a data rearrangement buffer 45 rearranges data pieces, a write data signal group {WID[3:0], WDATA[127:0], WSTRB[15:0], WLAST, WVALID} is output to the memory 3 via the data channel I/F unit 44. A signal WREADY is a signal indicating that the memory 3 has received the write data signal group from the address channel I/F unit 44.

The image processing module 2 also outputs, to the DMAW core part 40, a signal FLUSH indicating forced termination and a signal BANK_END_FLUSH indicating forced termination of a bank currently being accessed and access to a subsequent bank.

The memory 3 outputs a write auxiliary signal group {BID[3:0], BRESP[1:0], BVALID} for post-processing after write processing to the DMAW core part 40 via the data channel I/F unit 44. A signal BREADY is a signal indicating that the data channel I/F unit 44 has received the write auxiliary signal group form the memory 3.

The memory access controller 7 included in the DMAW 30 shown in FIG. 1 is constituted from the DMAW core part 40 as described above.

As described above, the DMAW 30 included in the DMAC 1 in the preferred embodiment includes the dynamic bank DMA-I/F unit 31 and the address operation-related register 33 that serve as an input/output port including an input part for the address information ADD2 and the addressing request signal REQ2, and an output part for the reply signal VAL2, as with the DMAR 10. The dynamic bank DMA-I/F unit 31 and the address operation-related register 33 are capable of performing signal input/output control processing of outputting, in response to the addressing request signal REQ2, the reply signal VAL2 indicating valid reception of the address information ADD2 to the image processing module 2 when the address information ADD2 is validly received.

The memory access controller (DMAW core part 40) included in the DMAW 30 can therefore perform memory access processing based on the address information ADD1 input via the dynamic bank DMA-I/F unit 31 and the address operation-related register 33. Since the DMAW 30 is not required to include storages for storing therein a plurality of pieces of the address information ADD2 (ADD1), a circuit size can be reduced, as with the DMAR 10.

In addition, in the dynamic bank mode of the DMAW 30, the image processing module 2 can perform write processing of sequentially writing data pieces to the memory 3 by switching a storage area to be accessed by the image processing module 2 through change of the address information ADD2. Consequently, the DMAW 30 in the preferred embodiment can continuously perform data transfer between the memory 3 and the image processing module 2 in write processing with respect to a desired storage area in the memory 3 as the storage area to be accessed, without intervention of the CPU 4. A load put on the CPU 4 can be reduced significantly.

As a result, memory access control processing of frequently interrupting the CPU 4 is reduced, and thus the CPU 4 can concentrate on other HW resources, leading to improvement of performance of a whole system.

As described above, the DMAC 1 in the preferred embodiment includes the DMAR 10 as a first data transfer controller that controls read transfer processing in response to the read request signal (RD_REQ), and the DMAW 30 as a second data transfer controller that controls write transfer processing in response to the write request signal (WR_REQ).

The DMAR 10 and the DMAW 30 each include the input/output port (the dynamic bank DMA-I/F unit 11+address operation-related register 13 and the dynamic bank DMA-I/F unit 31+the address operation-related register 33) for use in communicating with the image processing module 2, and the memory access controller (the DMAR core part 20 and the DMAW core part 40) independently of each other.

The DMAR 10 and the DMAW 30 constituting the DMAC 1 can perform read processing and write processing between the memory 3 and the DMAR core part 20 in parallel with each other.

(Repeat Transfer Processing)

Both in write processing and read processing, the address information ADD2 output from the image processing module 2 includes repeat control information {RPT_X_EN, RPT_Y_EN, RPT_Z_EN, RPT_X[23:0], RPT_Y[15:0], RPT_Z[15:0], OFS_X[23:0], OFS_Y[23:0], OFS_Z[23:0]} for repeat processing. The DMAR 10 (DMAW 30) can thus perform various types of repeat transfer processing based on the repeat control information.

(Repeat X Transfer Processing)

FIG. 5 schematically shows repeat X transfer processing. The repeat X transfer processing can be performed by setting a repeat X transfer mode, i.e., {RPT_X_EN=1, RPT_Y_EN=0, RPT_Z_EN=0}, in the address information ADD2.

The repeat X transfer processing is processing to conduct DMA transfer from a start address SAD1 (START_ADR [31:0]) to an end address EAD1 (END_ADR[31:0]) while repeating processing to add, after transfer of data of {RPT_X} bytes, an additional offset {OFS_X} (bytes) to an offset address, and to transfer data of {RPT_X} bytes again.

As a result, the repeat X transfer processing can be performed with respect to a repeat transfer area 81 in the memory 3 as an area to be accessed.

(Repeat Y Transfer Processing)

Figure 6:
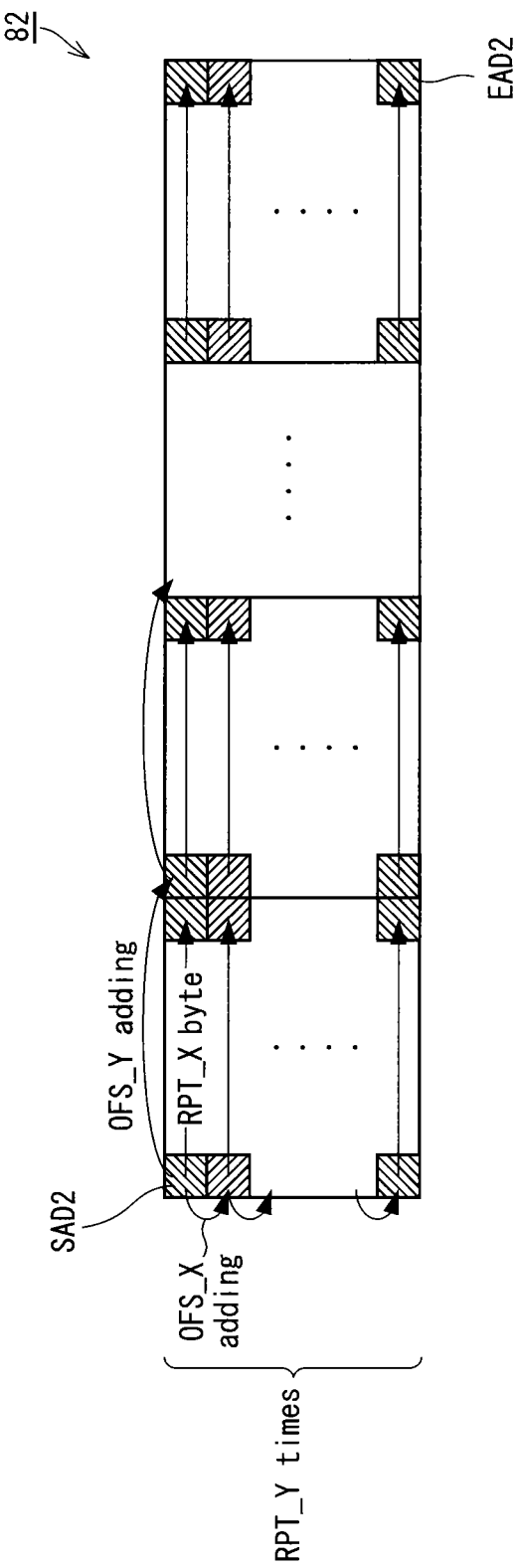
FIG. 6 schematically shows repeat Y transfer processing.

FIG. 6 schematically shows repeat Y transfer processing. The repeat Y transfer processing can be performed by setting a repeat Y transfer mode, i.e., {RPT_X_EN=1, RPT_Y_EN=1, RPT_Z_EN=0}, in the address information ADD2.

The repeat Y transfer processing is processing to conduct DMA transfer from a start address SAD2 (START_ADR [31:0]) to an end address EAD2 (END_ADR[31:0]) while repeating processing to add an additional offset {OFS_Y} (bytes) to an offset address after the repeat X transfer processing shown in FIG. 5 is repeatedly performed {RPT_Y} times.

As a result, the repeat Y transfer processing can be performed with respect to a repeat transfer area 82 in the memory 3 as an area to be accessed.

(Repeat Z Transfer Processing)

Figure 7:
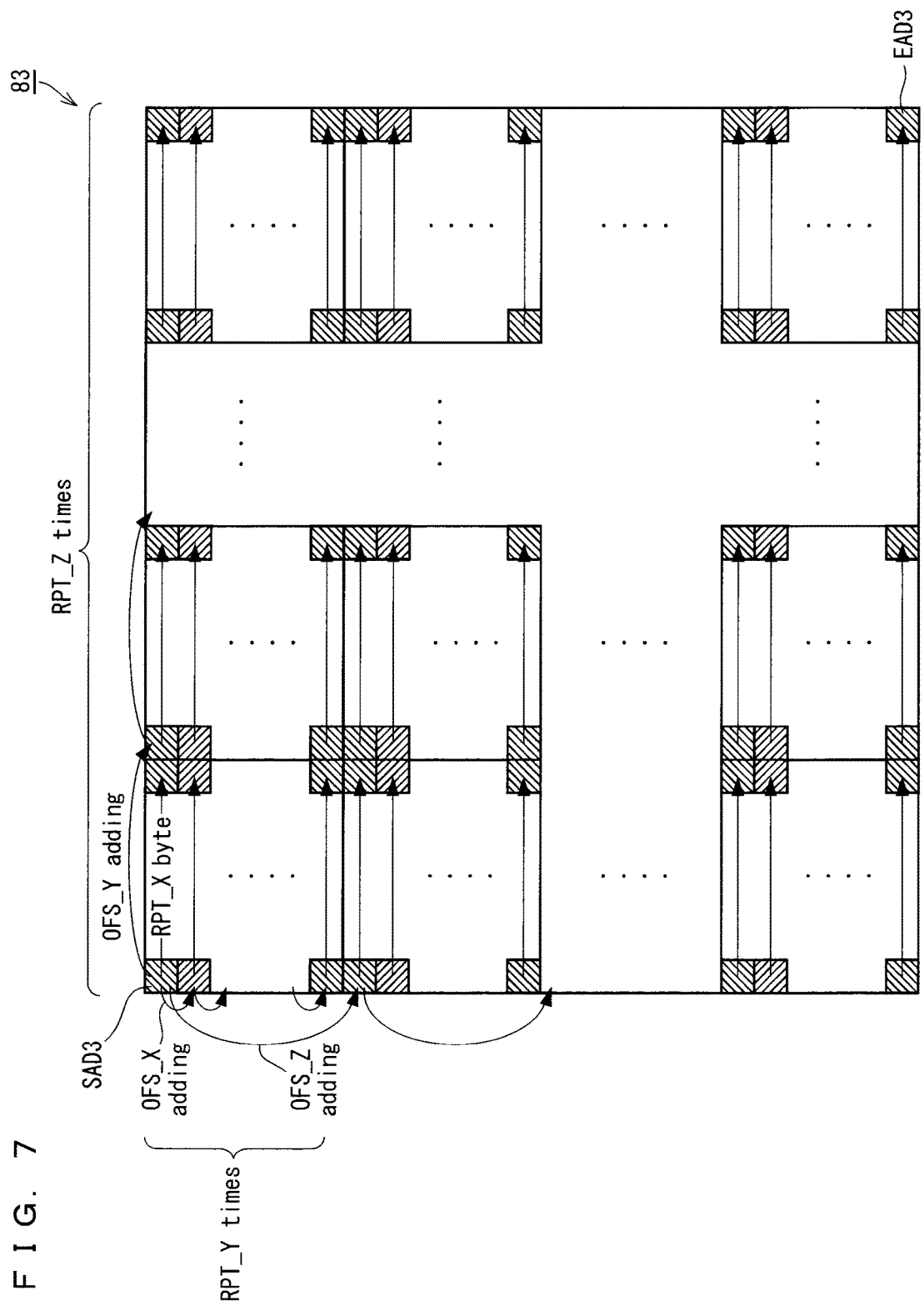
FIG. 7 schematically shows repeat Z transfer processing.
Figure 8:
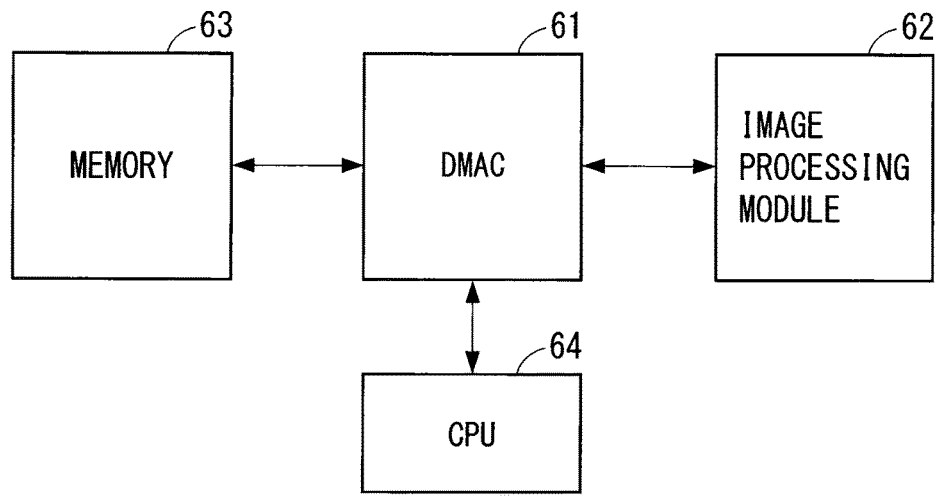
FIG. 8 is a block diagram schematically showing configuration of conventional DMA transfer.
Figure 9:
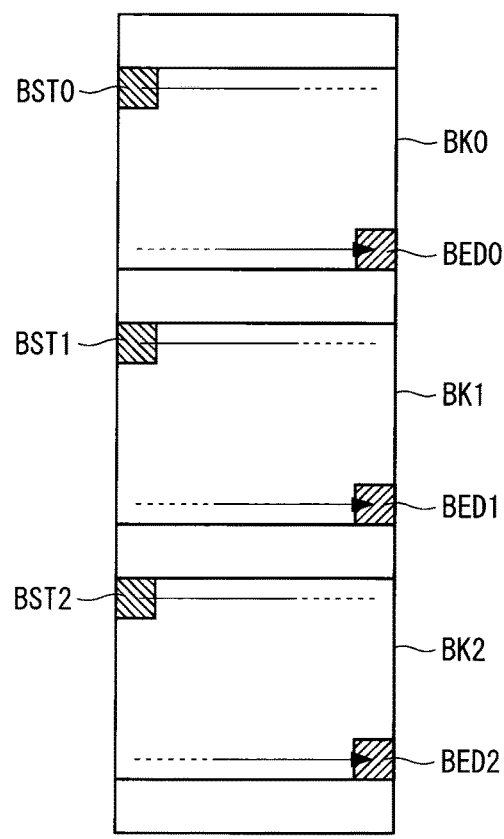
FIG. 9 schematically shows a plurality of banks in a memory shown in FIG. 8.

FIG. 7 schematically shows repeat Z transfer processing. The repeat Z transfer processing can be performed by setting a repeat Z transfer mode, i.e., {RPT_X_EN=1, RPT_Y_EN=1, RPT_Z_EN=1}, in the address information ADD2.

The repeat Z transfer processing is processing to conduct DMA transfer from a start address SAD3 (START_ADR [31:0]) to an end address EAD3 (END_ADR[31:0]) while repeating processing to add an additional offset {OFS_Z} (bytes) to an offset address after the repeat Y transfer processing is repeatedly performed {RPT_Z} times.

As a result, the repeat Z transfer processing can be performed with respect to a repeat transfer area 83 in the memory 3 as an area to be accessed.

As described above, in the preferred embodiment, the address information ADD2 output from the image processing module 2 includes the above-mentioned repeat control signal group as an access order indication signal indicating an access order in the storage area to be accessed.

The memory access controller included in the DMAC 1 (the memory access controller 7 (the DMAR core part 20) included in the DMAR 10 and the memory access controller (the DMAW core part 40) included in the DMAW 30) can perform memory access processing of accessing the repeat transfer areas 81-83 as storage areas to be accessed in accordance with the access order indicated by the above-mentioned repeat control signal group.

As a result, the DMAC 1 (DMAR 10 and DMAW 30) in the preferred embodiment can perform memory access processing of accessing storage areas to be accessed in the memory 3 in accordance with various access orders.

(Memory-containing Device 8)

The memory-containing device 8 shown in FIG. 1 may be implemented as various devices including a digital camera and a smartphone. For example, a memory-containing device can be obtained by mounting, at least on the same substrate, the DMAC 1 (DMAR 10+DMAW 30) in the preferred embodiment and a memory to/from which data is transferred from/to a predetermined module through control performed by the DMAC 1.

Such a memory-containing device allows for DMA data transfer between the memory 3 and the predetermined module without intervention of a controller such as a CPU while achieving reduction in device size.

In the preferred embodiment, the memory 3 is provided outside of the DMAC 1 as shown in FIG. 1. The DMAC 1, however, may be a memory-containing DMAC incorporating therein a memory function.

It should be noted that the present invention can be implemented by appropriately making modification or omission to the preferred embodiment without departing from the scope of the present invention.

While the invention has been shown and described in detail, the foregoing description is in all aspects illustrative and not restrictive. It is therefore understood that numerous modifications and variations can be devised without departing from the scope of the invention.

What is claimed is:

1. A data transfer control device that controls data transfer between a memory and a predetermined module, said predetermined module outputting an address signal group and an addressing request signal, the address signal group including a start address of a storage area to be accessed in said memory, the addressing request signal indicating a request for output of said address signal group, said data transfer control device comprising:

an input/output port for use in communicating with said predetermined module, said input/output port including an input part which receives said address signal group and said addressing request signal, and an output part which outputs an address valid signal indicating valid reception of said address signal group, said input/output port being capable of performing signal input/output control processing of outputting, in response to said addressing request signal, said address valid signal to said predetermined module when said address signal group is validly received; and a memory access controller performing memory access processing of accessing said storage area to be accessed in said memory based on said address signal group input via said input/output port.

2. The data transfer control device according to claim 1, wherein said memory access processing includes read processing of reading data from said storage area to be accessed in said memory and write processing of writing data to said storage area to be accessed in said memory, said data transfer control device comprises:

a first data transfer controller performing said read processing; and a second data transfer controller performing said write processing, and said first data transfer controller and said second data transfer controller each include said input/output port and said memory access controller independently of each other.

3. The data transfer control device according to claim 1, wherein said input/output port includes at least one signal storage holding said address signal group and said addressing request signal.

4. The data transfer control device according to claim 1, wherein said address signal group further includes an access order indication signal indicating an access order in said storage area to be accessed, and said memory access controller performs said memory access processing of accessing said storage area to be accessed in accordance with the access order indicated by said access order indication signal.

5. A memory-containing device comprising:

the memory; and the data transfer control device according to claim 1, the data transfer control device controlling data transfer between said memory and the predetermined module.

\* \* \* \* \*